United States Patent
Banerjee et al.

(10) Patent No.: US 11,339,495 B2
(45) Date of Patent: *May 24, 2022

(54) COATED DISCRETE METALLIC PARTICLES AND MULTILAYER STRUCTURES COMPRISING REFLECTIVE CORE LAYERS

(71) Applicants: Toyota Motor Engineering & Manufacturing North America, Inc., Plano, TX (US); Toyota Jidosha Kabushiki Kaisha, Aichi-ken (JP)

(72) Inventors: Debasish Banerjee, Ann Arbor, MI (US); Songtao Wu, Ann Arbor, MI (US); Naohide Uchida, Shizuoka (JP); Takeshi Yamakawa, Shizuoka (JP); Hidetaka Asano, Aichi-Ken (JP)

(73) Assignees: Toyota Motor Engineering & Manufacturing North America, Inc., Plano, TX (US); Toyota Jidosha Kabushiki Kaisha, Aichi-ken (JP)

( * ) Notice: Subject to any disclaimer, the term of this patent is extended or adjusted under 35 U.S.C. 154(b) by 56 days.

This patent is subject to a terminal disclaimer.

(21) Appl. No.: 16/878,724

(22) Filed: May 20, 2020

(65) Prior Publication Data
US 2021/0363655 A1 Nov. 25, 2021

(51) Int. Cl.
| C25D 11/34 | (2006.01) |
| G02B 5/08 | (2006.01) |
| G02B 1/10 | (2015.01) |

(52) U.S. Cl.
CPC ............... *C25D 11/34* (2013.01); *G02B 1/10* (2013.01); *G02B 5/0808* (2013.01)

(58) Field of Classification Search
CPC ......... G02B 1/10; G02B 5/0808; C25D 11/34
(Continued)

(56) References Cited

U.S. PATENT DOCUMENTS 3,812,022 A * 5/1974 Rogers et al. ......... C25D 15/02
  205/323
5,424,876 A * 6/1995 Fujii ........................ G02B 1/14
  359/884

(Continued)

FOREIGN PATENT DOCUMENTS

| JP | 2001189405 A | 7/2001 |
| KR | 100308638 B1 | 4/2002 |

*Primary Examiner* — Ricky D Shafer
(74) *Attorney, Agent, or Firm* — Dinsmore & Shohl LLP

(57) ABSTRACT

A discrete metallic particle having a metallic material, and a coating covering at least a portion of the metallic component. The discrete metallic particle has a thickness from 50 nm to 1000 nm, and the discrete metallic particle has a skin depth δ of greater than or equal to 1.0 μm in a frequency range from 20-40 GHz. The skin depth δ is calculated by:

$$\delta = \sqrt{\frac{2\rho}{(2\pi f)(\mu_0 \mu_r)}} \approx 503 \sqrt{\frac{\rho}{\mu_r f}}$$

Where δ is skin depth in meters (m); ρ is resistivity in ohm meter (Ω·m); f is frequency of an electromagnetic radiation in hertz (Hz); $\mu_0$ is permeability; and $\mu_r$ is relative permeability of the metallic material.

20 Claims, 10 Drawing Sheets

(58) Field of Classification Search
USPC .................................................. 359/838, 883
See application file for complete search history.

(56) References Cited

U.S. PATENT DOCUMENTS

| | | | |
|---|---|---|---|
| 5,990,768 A | 11/1999 | Takahashi et al. | |
| 6,329,649 B1 | 12/2001 | Jack et al. | |
| 6,329,655 B1 | 12/2001 | Jack et al. | |
| 6,530,668 B2* | 3/2003 | Krisko | C03C 17/36 |
| | | | 359/838 |
| 6,821,305 B2* | 11/2004 | Yan | B41M 5/24 |
| | | | 219/121.69 |
| 6,933,450 B2 | 8/2005 | Okumichi et al. | |
| 7,762,678 B2* | 7/2010 | Hoeing | C03C 17/3663 |
| | | | 359/883 |
| 8,487,831 B2 | 7/2013 | Koshida et al. | |
| 9,658,375 B2* | 5/2017 | Banerjee | G02B 5/0858 |
| 9,678,260 B2* | 6/2017 | Banerjee | G02B 5/286 |
| 10,882,996 B2* | 1/2021 | Wu | C09C 1/0015 |
| 10,998,638 B2* | 5/2021 | Banerjee | C22C 19/05 |
| 10,998,639 B2* | 5/2021 | Banerjee | C09D 5/004 |
| 11,009,630 B2* | 5/2021 | Wu | G02B 1/115 |
| 2008/0318012 A1* | 12/2008 | Domnick | C09C 1/0015 |
| | | | 428/216 |

* cited by examiner

COATED DISCRETE METALLIC PARTICLES AND MULTILAYER STRUCTURES COMPRISING REFLECTIVE CORE LAYERS

FIELD

The present application is related to discrete metallic particles and multilayer thin film structures having a reflective core layer, and in particular to discrete metallic particles and multilayer thin film structures having a reflective core layer that provide improved transmission.

BACKGROUND

The automotive industry is moving toward connected vehicles, which requires more and more sensors to be incorporated into vehicles. As examples, communication technologies are being incorporated into vehicles for safety applications, such as blind spot warnings, do not pass warnings, forward collision warnings, and dynamic cruise control. This increase in sensors has also increased the amount of data being transmitted, which requires more computation and data transmission rates on the vehicles. As an example, data transmission rates as high as 750 megabytes per second (Mb/sec) may be required.

In view of the increased connectedness of vehicles, the number of sensors incorporated into vehicles as well as the size of the sensors incorporated into vehicles is increasing. Because the physical design of a vehicle often requires significant effort and because it can be a driving force for sales of a vehicle, it is often times undesirable to have sensors that are visible upon viewing the exterior of the vehicle, as these sensors can have a negative impact on the design. Therefore, it is often the case that sensors are positioned within (e.g., either under a panel of the vehicle, or having a panel formed around the sensor) the body of a vehicle. In such a design, a layer of paint will also cover the sensor to further obscure its presence.

SUMMARY

According to embodiments, a discrete metallic particle comprises: an anodized metallic component, wherein the discrete metallic particle has a thickness from 50 nm to 1000 nm, and the discrete metallic particle has a skin depth $\delta$ of greater than or equal to 1.0 μm in a frequency range from 20-40 GHz, as calculated by:

$$\delta = \sqrt{\frac{2\rho}{(2\pi f)(\mu_0 \mu_r)}} \approx 503\sqrt{\frac{\rho}{\mu_r f}},$$

wherein $\delta$ is skin depth in meters (m); $\rho$ is resistivity in ohm meter (Ω·m); f is frequency of an electromagnetic radiation in hertz (Hz); $\mu_0$ is permeability; and $\mu_r$ is relative permeability of the metallic material.

According to embodiments, a multilayer thin film that reflects an omnidirectional structural color comprises: a reflective core layer comprising an anodized metallic material; a second layer extending across the reflective core layer, wherein the second layer is a dielectric absorber or dielectric material; a third layer extending across the second layer, wherein the third layer comprises a semi-transparent absorbing layer; and an outer layer extending across the third layer, wherein the outer layer is formed from a dielectric material or a colorful dielectric material, wherein the multilayer thin film reflects a single narrow band of visible light that is less than 30° measured in Lab color space when the multilayer thin film is exposed to broadband electromagnetic radiation and viewed from angles between 0° and 45° relative to a direction normal to an outer surface of the multilayer thin film.

According to some embodiments, a multilayer thin film that reflects omnidirectional structural color comprises: a reflective core layer comprising an anodized metallic material; a protective layer encapsulating the reflective core layer; a second layer extending across at least a portion of the protective layer; a third layer extending across the second layer; and an outer layer extending across the third layer, wherein the outer layer is formed from a dielectric absorbing material or a dielectric material, wherein the multilayer thin film reflects a single narrow band of visible light having a color shift of the single narrow band of visible light is less than 30° measured in Lab color space when the multilayer thin film is exposed to broadband electromagnetic radiation and viewed from angles between 0° and 45° relative to a direction normal to an outer surface of the multilayer thin film.

In some embodiments, the reflective core layer has a skin depth $\delta$ of greater than or equal to 1.0 μm in a frequency range from 20-40 GHz, as calculated by:

$$\delta = \sqrt{\frac{2\rho}{(2\pi f)(\mu_0 \mu_r)}} \approx 503\sqrt{\frac{\rho}{\mu_r f}},$$

wherein $\delta$ is a skin depth in meters (m); $\rho$ is a resistivity of the medium in ohm meter (Ω·m); f is the frequency of an electromagnetic radiation in hertz (Hz); $\mu_0$ is the permeability; and $\mu_r$ is a relative permeability of the metallic material.

According to embodiments, the reflective core layer has a transmission attenuation for a metallic component having a thickness from 40 nm to 120 nm at a frequency from 20 to 30 GHz that is less than or equal to 45 db; a transmission attenuation for a metallic component having a thickness from greater than 120 nm to 200 nm at a frequency from 20 to 30 GHz that is less than or equal to 55 db; and a reflective core layer has a transmission attenuation for a metallic component having a thickness from 40 nm to 120 nm at a frequency from 70 to 80 GHz that is less than or equal to 50 db.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Metallic components that transmit millimeter wave (mm-wave) electromagnetic radiation are provided in this disclosure. In embodiments, the metallic component may be a discrete metallic particle. In some embodiments, the metallic component may be included in a structure that produces omnidirectional structural color, which has the form of a multilayer thin film (also referred to as a multilayer stack herein). The multilayer thin films reflects a narrow band of electromagnetic radiation in the visible spectrum and has a small or non-noticeable hue shift when the multilayer thin film is viewed from angles between 0 to 45 degrees. The multilayer particles and thin films according to embodiments disclosed and described herein are also capable of transmitting an increased amount of mm-wave electromagnetic radiation. The multilayer thin films can be used as pigment in compositions (such as, for example, a paint composition), a continuous thin film on a structure, and the like.

As mentioned previously, the automotive industry is moving toward increasingly connected vehicles, which requires an increased number and size of sensors to be incorporated into the vehicle. It is apparent that as more and more sensors are incorporated into the vehicle, additional channels for communication are to be used because it is often undesirable to have multiple sensors communicating on the same channel. One channel that can be used for communication on vehicles is the mm-wave spectral channel (e.g., mm-wave electromagnetic radiation). In particular, mm-wave electromagnetic radiation can transmit a large amount of data. Additionally, with recent advancements in complementary metal oxide semiconductor (CMOS) technology, mm-wave electromagnetic radiation producing devices and mm-wave detecting sensors have become more cost effective.

However, electromagnetic radiation in the mm-wave spectral channel has difficulty passing through metals, and in some instances cannot penetrate metals at all. For this reason, mm-wave sensors and devices are generally placed underneath plastic portions of the vehicle body. But, for vehicles that include metal components in the paint or as a coating, even a relatively thin layer of paint or thin coating comprising the metal component can prevent the mm-wave spectra from penetrating the paint or coating. This phenomenon is referred to herein as the "skin effect," which is described in further detail below.

Figure 1:
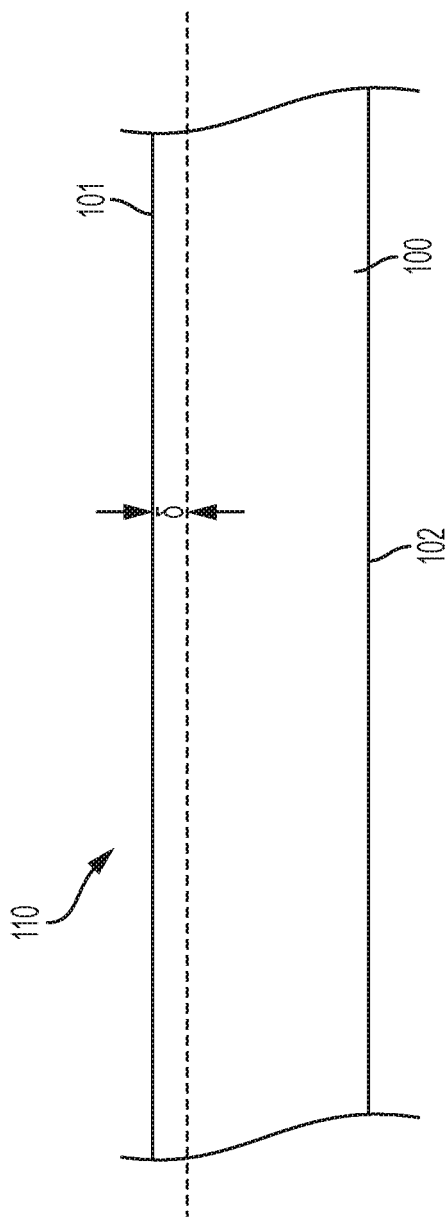
FIG. 1 depicts skin depth on a schematic cross section of a metallic component.

The depth to which electromagnetic radiation can penetrate a conducting surface, such as, for example, a surface of a metal component, decreases as the conductivity and the oscillation frequency increase. This depth is referred to as "skin depth." FIG. 1 provides a schematic that shows the skin depth δ of a metallic component 100. The metallic component 100 has a first surface 101 that is incident to the electromagnetic radiation 110 and a second surface 102 that is opposite of the electromagnetic radiation 110. The electromagnetic radiation 110 penetrates through the first surface 101 and into the metallic component 100 to a skin depth δ that, in the schematic shown in FIG. 1, is less than the thickness of the metallic component. In the case of mm-wave electromagnetic radiation, which has a relatively high oscillation frequency and conductivity, the skin depth δ is relatively small. This phenomena is also realized on other metal components, such as metal flakes and multilayer thin films comprising metallic core layers.

Figure 2:
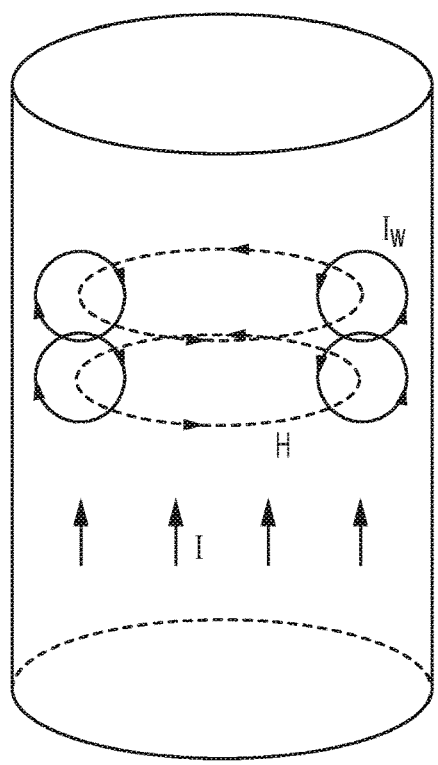
FIG. 2 is a schematic view of a conductive material depicting the skin effect.

With reference now to FIG. 2, it is believed that the skin effect is caused by circulating eddy currents $I_w$ induced by a change in H field in a conductive material. When the frequency of electromagnetic radiation I in a conductive material changes, a magnetic field is induced. The induced magnetic field forces the electromagnetic radiation to the outside—or skin—of the conductive material, as shown in FIG. 2. In this way, electromagnetic radiation is impeded from penetrating the conductive material beyond the skin depth. Thus, when the skin depth is small, electromagnetic radiation is highly impeded from penetrating the conductive material, but when the skin depth is large, electromagnetic radiation is more able to penetrate the conductive material. Put differently, in cases where it is desired for electromagnetic radiation to penetrate a conductive material, as is the case with sensors described previously, larger skin depth is preferred.

In view of the above, the skin depth δ of a material may be determined by the electrical conductivity, magnetic permeability, and frequency of the electromagnetic wave by the relationship shown in Equation (1):

$$\delta = \sqrt{\frac{2\rho}{(2\pi f)(\mu_0 \mu_r)}} \approx 503 \sqrt{\frac{\rho}{\mu_r f}} \tag{1}$$

where δ is the skin depth in meters (m); ρ is the resistivity of the medium in ohm meter (Ω·m); f is the frequency of the electromagnetic radiation in hertz (Hz); $\mu_0$ is the permeability; and $\mu_r$ is the relative permeability of the metallic material.

Figure 3:
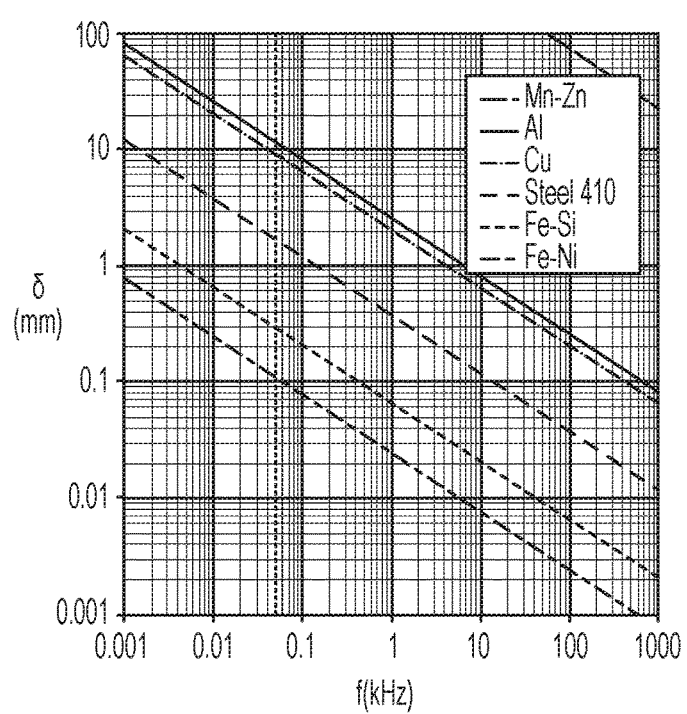
FIG. 3 is a graph depicting the skin depth in millimeters versus the frequency in kHz of various metallic materials.

Using Equation (1), the relationship of skin depth to electromagnetic frequency for various metals can be measured. FIG. 3 is a graph of the relationship of skin depth to frequency for a manganese zinc alloy, aluminum, copper, steal 410, an iron silicon alloy, and an iron nickel alloy. The y-axis in the graph of FIG. 3 is the skin depth δ in mm, and the x-axis in the graph of FIG. 3 is the frequency f in kilohertz (kHz). As can be seen in FIG. 3, the skin depth of certain metals, such as aluminum and copper, can be as high as 100 mm while the skin depths of other metals, such as iron silicon alloy and iron nickel alloy, can be slightly below 1 mm at electromagnetic radiation frequencies around 0.001 kHz. However, as the frequency increases to 1000 kHz, the skin depths of nearly all the metals and metal alloys measured in FIG. 3—with the exception of manganese zinc alloy—are 1 mm or below. This shows the dependency of skin depth on electromagnetic radiation frequency. The frequency of mm-wave electromagnetic radiation can range from 30 gigahertz (GHz) to 300 GHz. Thus, extrapolating the graph provided in FIG. 3 to mm-wave electromagnetic radiation frequencies will result in skin depths on the scale of microns, which can prevent the transmission of mm-wave electromagnetic radiation.

Figure 4A:
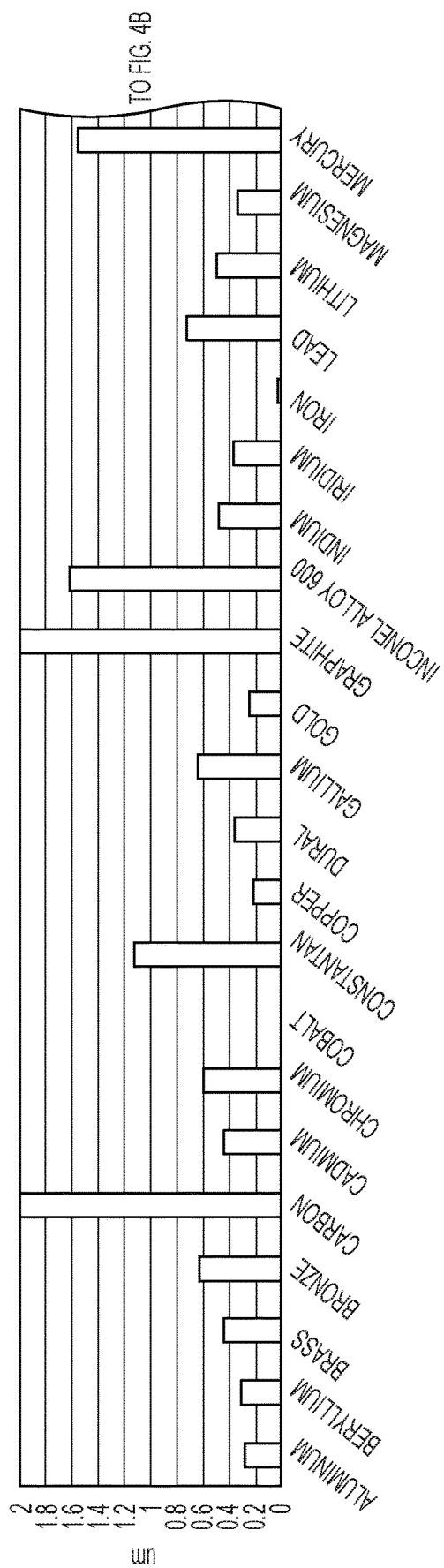
FIGS. 4A and 4B are bar charts depicting the skin depth in microns of various metallic materials at a frequency of 100 gigahertz.
Figure 4B:
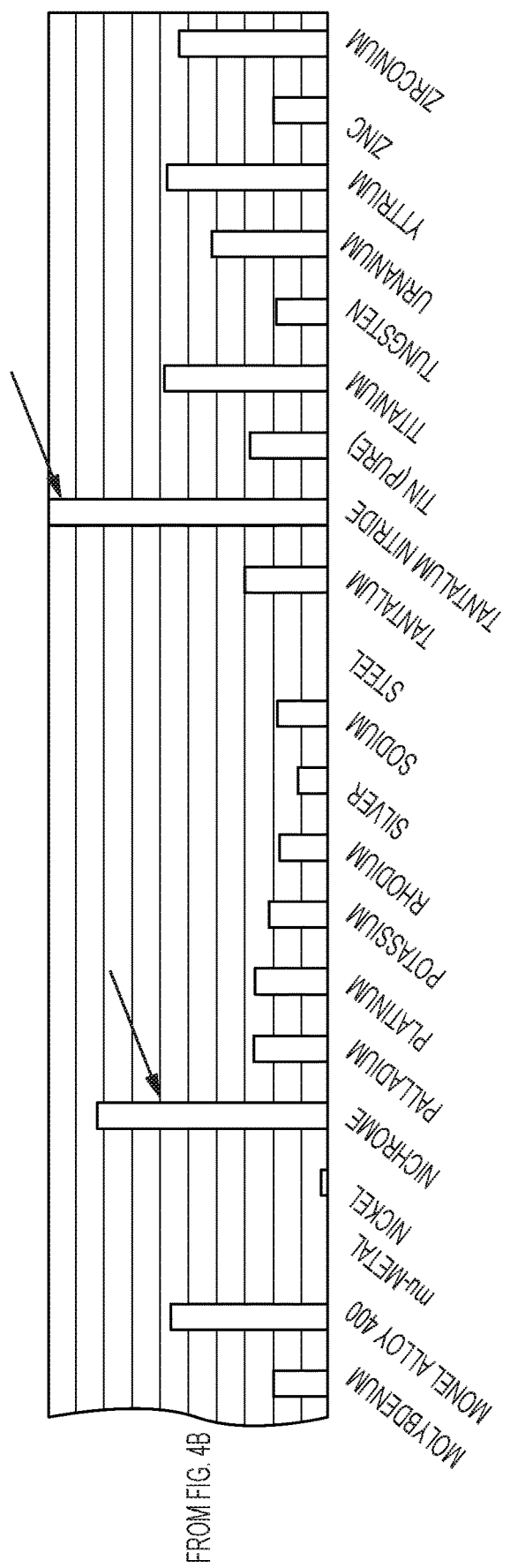

FIG. 4 is a bar graph that shows the skin depth δ of various metallic materials at a frequency of 100 GHz. The metallic materials are listed along the x-axis and the skin depth δ is provided in microns (μm) along the y-axis. The skin depth δ shown in FIG. 4 can be obtained using Equation (1). As can be seen in FIG. 4, many of the metallic materials have a skin depth δ below one micron. Metallic materials with skin depths δ this low—i.e., below one micron—are not good candidates for use as metal components in paints, polymers, polymers, or coatings or as components in multilayer thin films disclosed and described herein because their small skin depth will impede the transmission of mm-wave electromagnetic radiation. Thus, if these materials that have a low skin depth are used in paints, polymers, polymers, coatings, or multilayer thin films that are present on a vehicle, their presence could negatively affect mm-wave electromagnetic transmission devices and mm-wave electromagnetic detecting sensors.

As shown in FIG. 4, metallic materials used in paints, polymers, coatings, or as reflective core layers of multilayer thin films, such as, for example, aluminum, brass, bronze, copper, and gold, all have skin depths δ below one micron. Thus, these materials may not be suitable for use as paints, polymers, coatings, or as reflective core layers of multilayer thin films where these items are to be applied to vehicles that comprise mm-wave electromagnetic radiation transmitting devices and/or mm-wave electromagnetic sensors. However, many of the materials that have larger skin depths δ are not suitable for use in paints, polymers, coatings, or as reflective core layers in multilayer thin films. For instance, carbon, graphite, and tantalum nitride will often not have the desired reflectance—even after substantial finishing and polishing—for use in paints, polymers, coatings, or as a reflective core layer in a multilayer thin film. Further, mercury is not suitable from physical and environmental standpoints. Accordingly, in embodiments disclosed and described herein, a balance is struck between the skin depth δ of metallic materials and their suitability for use in paints, polymers, coatings, or as a reflective core layer in a multilayer thin film.

It has been found that nickel chromium alloys provide a good combination of high skin depth δ and suitability for use in paints, polymers, coatings, or as a reflective core layer in multilayer thin films. As shown in FIG. 4, various nickel chromium alloys—Inconel alloy 600, nickel-chromium (60-40), and nichrom (80-20)—have a skin depth δ that is greater than one micron and can be finished and polished to have a reflectance that is acceptable for use in paints, polymers, coatings, or as reflective core layers in a multilayer thin films.

Figure 5:
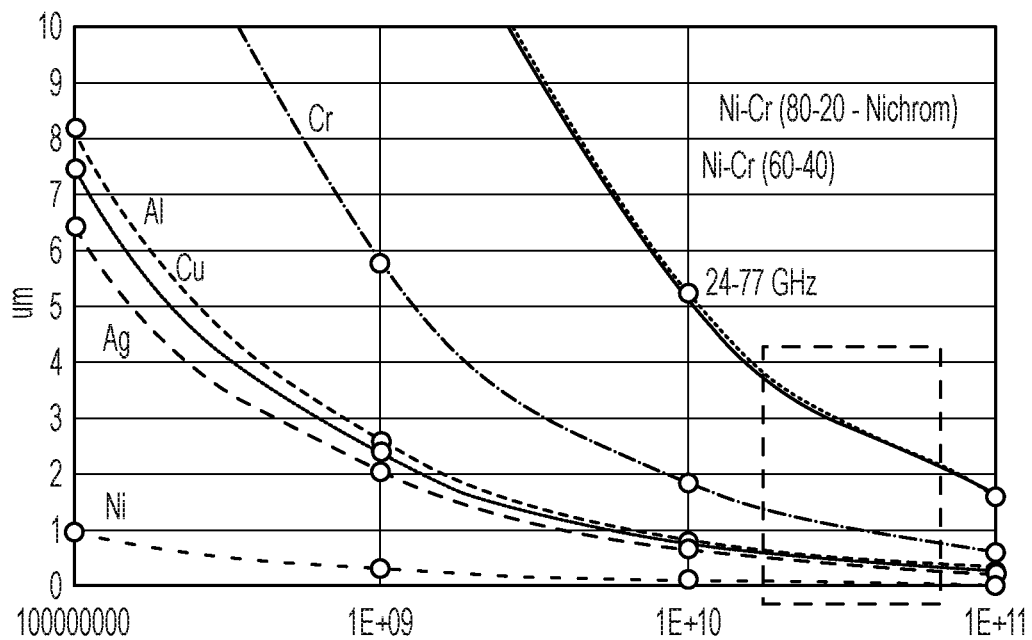
FIG. 5 graphically depicts the skin depth in microns versus the frequency in hertz of various metallic materials.

FIG. 5 is a plot that shows, in more detail than FIG. 4, the skin depth δ of certain metallic materials that are suitable for use in paints, polymers, coatings, or as reflective core layers in multilayer thin films. In particular FIG. 5 shows the skin depth δ of nickel (Ni), silver (Ag), copper (Cu), aluminum (Al), chromium (Cr), nichrom (Ni—Cr 80-20), and nickel-chromium (Ni—Cr 60-40). The y-axis in FIG. 5 provides the skin depth in microns and the x-axis provides the frequency in hertz. A target frequency for mm-wave electromagnetic radiation of 24-77 GHz is highlighted in the dashed box in the lower right corner of FIG. 5. In this highlighted box, it becomes clear that NiCr alloy materials have significantly greater skin depth δ than the other metallic materials that are suitable for use as particles or as reflective core layers in a multilayer thin film. For instance, at a frequency of about 24 GHz, the NiCr materials (i.e., nichrom 80-20 and nickel-chromium (60-40) alloy) have a skin depth δ of nearly 4 microns, while chromium (which has the greatest skin depth δ other than the NiCr materials) has a skin depth δ of less than 2 microns.

As disclosed hereinabove, and shown in the data presented in FIG. 4 and FIG. 5, NiCr metallic materials have greater skin depth δ at various frequencies than other metallic materials that can be used in paints, polymers, coatings, or as reflective core layers in multilayer thin films. In particular, the skin depth δ of NiCr metallic materials is significantly larger at the high frequencies that correspond to mm-wave electromagnetic radiation. This increased skin depth δ of NiCr metallic materials at high frequencies allows for improved transmission of mm-wave electromagnetic radiation. Accordingly, in embodiments disclosed and described herein, metallic materials that have a greater skin depth δ can be used in paints, polymers, coatings, or as reflective core layers in multilayer thin films.

In embodiments, metal components used in paints, polymers, coatings, or as the reflective core layer of a multilayer thin film will have a skin depth δ (as calculated by Equation (1) above) of greater than or equal to 1.0 μm in a frequency range from 20-40 GHz, such as greater than or equal to 1.5 μm in a frequency range from 20-40 GHz, greater than or equal to 2.0 μm in a frequency range from 20-40 GHz, greater than or equal to 2.5 μm in a frequency range from 20-40 GHz, greater than or equal to 3.0 μm in a frequency range from 20-40 GHz, greater than or equal to 3.5 μm in a frequency range from 20-40 GHz, or greater than or equal to 4.0 μm in a frequency range from 20-40 GHz. It should be understood that the maximum skin depth δ in embodiments of metal components used in paints, polymers, coatings, or as the reflective core layer of a multilayer thin film is not particularly limited. However, in some embodiments metal components used in paints, polymers, coatings, or as the reflective core layer of a multilayer thin film will have a maximum skin depth δ of 4.0 μm in a frequency range from 20-40 GHz, such as 3.5 μm in a frequency range from 20-40 GHz, 3.0 μm in a frequency range from 20-40 GHz, 2.5 μm in a frequency range from 20-40 GHz, 2.0 μm in a frequency range from 20-40 GHz, or 1.5 μm in a frequency range from 20-40 GHz. It should be understood that each of the foregoing maximum skin depth δ values can be individually combined with any of the skin depth δ ranges recited in this paragraph. Accordingly, in embodiments, the skin depth δ of metal components used in paints, polymers, coatings, or as the reflective core layer of a multilayer thin film is from 1.0 μm to 4.0 μm in a frequency range from 20-40 GHz, such as from 1.5 µm to 4.0 µm in a frequency range from 20-40 GHz, from 2.0 µm to 4.0 µm in a frequency range from 20-40 GHz, from 2.5 µm to 4.0 µm in a frequency range from 20-40 GHz, from 3.0 µm to 4.0 µm in a frequency range from 20-40 GHz, or from 3.5 µm to 4.0 µm in a frequency range from 20-40 GHz.

In embodiments, flakes used in paint, coatings, or as the reflective core layer of a multilayer thin film will have a skin depth δ (as calculated by Equation (1) above) of greater than or equal to 0.5 µm in a frequency range from 40-100 GHz, such as greater than or equal to 0.6 µm in a frequency range from 40-100 GHz, greater than or equal to 0.8 µm in a frequency range from 40-100 GHz, greater than or equal to 1.0 µm in a frequency range from 40-100 GHz, greater than or equal to 1.2 µm in a frequency range from 40-100 GHz, greater than or equal to 1.4 µm in a frequency range from 40-100 GHz, greater than or equal to 1.6 µm in a frequency range from 40-100 GHz, greater than or equal to 1.8 µm in a frequency range from 40-100 GHz, or greater than or equal to 2.0 µm in a frequency range from 40-100 GHz. It should be understood that the maximum skin depth δ of metal components used in paints, polymers, coatings, or as the reflective core layer of a multilayer thin film of embodiments is not particularly limited. However, in some embodiments the maximum skin depth δ is 2.0 µm in a frequency range from 40-100 GHz, such as 1.8 µm in a frequency range from 40-100 GHz, 1.6 µm in a frequency range from 40-100 GHz, 1.4 µm in a frequency range from 40-100 GHz, 1.2 µm in a frequency range from 40-100 GHz, 1.0 µm in a frequency range from 40-100 GHz, 0.8 µm in a frequency range from 40-100 GHz, or 0.6 µm in a frequency range from 40-100 GHz. It should be understood that each of the foregoing maximum skin depth δ values can be individually combined with any of the skin depth δ ranges recited in this paragraph. Accordingly, in embodiments, the skin depth δ of metal components used in paints, polymers, coatings, or as the reflective core layer of a multilayer thin film is from 0.5 µm to 2.0 µm in a frequency range from 40-100 GHz, such as from 0.6 µm to 2.0 µm in a frequency range from 40-100 GHz from 0.8 µm to 2.0 µm in a frequency range from 40-100 GHz, from 1.0 µm to 2.0 µm in a frequency range from 40-100 GHz, from 1.2 µm to 2.0 µm in a frequency range from 40-100 GHz, from 1.4 µm to 2.0 µm in a frequency range from 40-100 GHz from 1.6 µm to 2.0 µm in a frequency range from 40-100 GHz, or from 1.8 µm to 2.0 µm in a frequency range from 40-100 GHz.

As disclosed hereinabove, increased skin depth correlates to improved transmission of mm-wave electromagnetic radiation through the metallic material. Another way to measure the transmission of mm-wave electromagnetic radiation through the metallic material is the transmission attenuation (e.g., the reduction of the strength of the mm-wave electromagnetic radiation as it passes through the metallic material). The transmission attenuation is measured according to the standard automotive radar measurement procedure (and as further detailed in the examples below). It should be understood that the transmission attenuation will vary based on both the frequency of the mm-wave electromagnetic radiation and the thickness of the metallic material.

In embodiments, films having a thickness from 40 nm to 120 nm and made from metallic materials disclosed and described herein have a transmission attenuation at a frequency from 20 to 30 GHz that is less than or equal to 45 decibels (db), such as less than or equal to 40 db, less than or equal to 35 db, less than or equal to 30 db, or less than or equal to 20 db. It should be understood that the minimum transmission attenuation of films made from metallic materials as disclosed and described herein is not particularly limited. However, in some embodiments, the minimum transmission attenuation for a film having a thickness from 40 nm to 120 nm and made from metallic materials disclosed and described herein at a frequency from 20 to 30 GHz is 15 db, such as 20 db, 25 db, or 30 db. It should be understood that each of the foregoing transmission attenuation values can be individually combined with any of transmission attenuation ranges recited in this paragraph. Accordingly, in embodiments, the transmission attenuation for a metallic film having a thickness from 40 nm to 120 nm and made from metallic materials disclosed and described herein at a frequency from 20 to 30 GHz is from 15 db to 45 db, such as from 20 db to 45 db, from 25 db to 45 db, from 30 db to 45 db, from 35 db to 45 db, or from 40 db to 45 db.

In some embodiments, films having a thickness from 120 nm to 200 nm and made from metallic materials disclosed and described herein have a transmission attenuation at a frequency from 20 to 30 GHz that is less than or equal to 55 db, such as less than or equal to 50 db, or less than or equal to 45 db. It should be understood that the minimum transmission attenuation of metal films made from metallic materials disclosed and described herein is not particularly limited. However, in some embodiments, the minimum transmission attenuation for a film having a thickness from greater than 120 nm to 200 nm and made from metallic materials disclosed and described herein at a frequency from 20 to 30 GHz is 40 db or 45 db. It should be understood that each of the foregoing transmission attenuation values can be individually combined with any of transmission attenuation ranges recited in this paragraph. Accordingly, in embodiments, the transmission attenuation for a film having a thickness from greater than 120 nm to 200 nm and made from metallic materials disclosed and described herein at a frequency from 20 to 30 GHz is from 40 db to 55 db, such as from 40 db to 50 db, or from 40 db to 45 db.

In some embodiments, films having a thickness from 200 nm to 280 nm and made from metallic materials disclosed and described herein have a transmission attenuation at a frequency from 20 to 30 GHz that is less than or equal to 65 db, such as less than or equal to 60 db, or less than or equal to 55 db. It should be understood that the minimum transmission attenuation of films made from metallic materials disclosed and described herein is not particularly limited. However, in some embodiments, the minimum transmission attenuation for a film having a thickness from greater than 200 nm to 280 nm and made from metallic materials disclosed and described herein at a frequency from 20 to 30 GHz is 50 db or 55 db. It should be understood that each of the foregoing transmission attenuation values can be individually combined with any of transmission attenuation ranges recited in this paragraph. Accordingly, in embodiments, the transmission attenuation for a film having a thickness from greater than 200 nm to 280 nm and made from metallic materials disclosed and described herein at a frequency from 20 to 30 GHz is from 50 db to 65 db, such as from 50 db to 60 db, or from 50 db to 55 db.

In some embodiments, films having a thickness from greater than 280 nm to 360 nm and made from metallic materials disclosed and described herein have a transmission attenuation at a frequency from 20 to 30 GHz that is less than or equal to 70 db, such as less than or equal to 65 db, or less than or equal to 60 db. It should be understood that the minimum transmission attenuation of films made from metallic materials disclosed and described herein is not particularly limited. However, in some embodiments, the minimum transmission attenuation for a film having a thickness from greater than 280 nm to 360 nm and made from metallic materials disclosed and described herein at a frequency from 20 to 30 GHz is 55 db or 60 db. It should be understood that each of the foregoing transmission attenuation values can be individually combined with any of transmission attenuation ranges recited in this paragraph. Accordingly, in embodiments, the transmission attenuation for a film having a thickness from greater than 200 nm to 280 nm and made from metallic materials disclosed and described herein at a frequency from 20 to 30 GHz is from 55 db to 70 db, such as from 55 db to 65 db, or from 55 db to 60 db.

In some embodiments, metallic materials for use in paints, polymers, coatings, or as reflective core layers in multilayer thin films have a transmission attenuation for a metallic component having a thickness from greater than 360 nm to 500 nm at a frequency from 20 to 30 GHz that is less than or equal to 75 db, such as less than or equal to 70 db. It should be understood that the minimum transmission attenuation of metal components used in paints, polymers, coatings, or as the reflective core layer of a multilayer thin film is not particularly limited. However, in some embodiments, the minimum transmission attenuation for a metallic component having a thickness from greater than 360 nm to 400 nm at a frequency from 20 to 30 GHz is 65 db or 70 db. It should be understood that each of the foregoing transmission attenuation values can be individually combined with any of transmission attenuation ranges recited in this paragraph. Accordingly, in embodiments, the transmission attenuation for a metallic component having a thickness from greater than 360 nm to 400 nm at a frequency from 20 to 30 GHz is from 65 db to 75 db, such as from 65 db to 70 db.

In some embodiments, films having a thickness from 40 nm to 120 nm and made from metallic materials disclosed and described herein have a transmission attenuation at a frequency from 70 to 80 GHz that is less than or equal to 50 db, such as less than or equal to 45 db, less than or equal to 40 db, less than or equal to 35 db, or less than or equal to 30 db. It should be understood that the minimum transmission attenuation of films made from metallic materials disclosed and described herein is not particularly limited. However, in some embodiments, the minimum transmission attenuation for a film having a thickness from 40 nm to 120 nm and made from metallic materials disclosed and described herein at a frequency from 70 to 80 GHz is 25 db, such as 30 db, or 35 db. It should be understood that each of the foregoing transmission attenuation values can be individually combined with any of transmission attenuation ranges recited in this paragraph. Accordingly, in embodiments, the transmission attenuation for a film having a thickness from 40 nm to 120 nm and made from metallic materials disclosed and described herein at a frequency from 70 to 80 GHz is from 25 db to 50 db, such as from 25 db to 45 db, from 25 db to 40 db, from 25 db to 35 db, or from 25 db to 30 db.

In some embodiments, films having a thickness from greater than 120 nm to 200 nm and made from metallic materials disclosed and described herein have a transmission attenuation at a frequency from 70 to 80 GHz that is less than or equal to 65 db, such as less than or equal to 60 db, less than or equal to 55 db, or less than or equal to 50 db. It should be understood that the minimum transmission attenuation of films made from metallic materials disclosed and described herein is not particularly limited. However, in some embodiments, the minimum transmission attenuation for a film having a thickness from greater than 120 nm to 200 nm and made from metallic materials disclosed and described herein at a frequency from 70 to 80 GHz is 45 db, such as 50 db, or 55 db. It should be understood that each of the foregoing transmission attenuation values can be individually combined with any of transmission attenuation ranges recited in this paragraph. Accordingly, in embodiments, the transmission attenuation for a film having a thickness from greater than 120 nm to 200 nm and made from metallic materials disclosed and described herein at a frequency from 70 to 80 GHz is from 45 db to 65 db, such as from 45 db to 60 db, from 45 db to 55 db, or from 45 db to 50 db.

In some embodiments, films having a thickness from greater than 200 nm to 280 nm and made from metallic materials disclosed and described herein have a transmission attenuation at a frequency from 70 to 80 GHz that is less than or equal to 80 db, such as less than or equal to 75 db. It should be understood that the minimum transmission attenuation of films having a thickness from greater than 200 nm to 280 nm is not particularly limited. However, in some embodiments, the minimum transmission attenuation for a film having a thickness from greater than 200 nm to 280 nm and having a thickness from greater than 200 nm to 280 nm at a frequency from 70 to 80 GHz is 70 db or 75 db. It should be understood that each of the foregoing transmission attenuation values can be individually combined with any of transmission attenuation ranges recited in this paragraph. Accordingly, in embodiments, the transmission attenuation for a film having a thickness from greater than 200 nm to 280 nm and having a thickness from greater than 200 nm to 280 nm at a frequency from 70 to 80 GHz is from 70 db to 80 db, such as from 70 db to 75 db.

In some embodiments, films having a thickness from greater than 360 nm to 500 nm and made from metallic materials disclosed and described herein have a transmission attenuation at a frequency from 70 to 80 GHz that is less than or equal to 90 db, such as less than or equal to 85 db, or less than or equal to 80 db. It should be understood that the minimum transmission attenuation of films made from metallic materials disclosed and described herein is not particularly limited. However, in some embodiments, the minimum transmission attenuation for a film having a thickness from greater than 360 nm to 500 nm and made from metallic materials disclosed and described herein at a frequency from 70 to 80 GHz is 75 db or 80 db. It should be understood that each of the foregoing transmission attenuation values can be individually combined with any of transmission attenuation ranges recited in this paragraph. Accordingly, in embodiments, the transmission attenuation for a film having a thickness from greater than 360 nm to 500 nm and made from metallic materials disclosed and described herein at a frequency from 70 to 80 GHz is from 75 db to 90 db, such as from 75 db to 85 db, or from 75 db to 80 db.

In some embodiments, films having a thickness from greater than 280 nm to 360 nm and made from metallic materials disclosed and described herein have a transmission attenuation at a frequency from 70 to 80 GHz that is less than or equal to 75 db, such as less than or equal to 70 db, or less than or equal to 65 db. It should be understood that the minimum transmission attenuation of films made from metallic materials disclosed and described herein is not particularly limited. However, in some embodiments, the minimum transmission attenuation for a film having a thickness from greater than 280 nm to 360 nm and made from metallic materials disclosed and described herein at a frequency from 70 to 80 GHz is 60 db or 65 db. It should be understood that each of the foregoing transmission attenuation values can be individually combined with any of transmission attenuation ranges recited in this paragraph. Accordingly, in embodiments, the transmission attenuation for a film having a thickness from greater than 280 nm to 360 nm and made from metallic materials disclosed and described herein at a frequency from 70 to 80 GHz is from 60 db to 75 db, such as from 60 db to 70 db, or from 60 db to 65 db.

Previously, aluminum particles were added to paint, polymers, and coatings, or used as reflective core layers in multilayer thin film structures. Accordingly, the attenuation of NiCr films to the attenuation of aluminum films of the same thickness and at the same frequency of electromagnetic radiation provide insight into the improvement in attenuation when using NiCr compared to aluminum. According to embodiments, NiCr films have an attenuation that is at least 15 db less than aluminum films of the same thickness and at the same frequency of electromagnetic radiation, such as at least 20 db less than aluminum films of the same thickness and at the same frequency of electromagnetic radiation, at least 25 db less than aluminum films of the same thickness and at the same frequency of electromagnetic radiation, at least 30 db less than aluminum films of the same thickness and at the same frequency of electromagnetic radiation, at least 35 db less than aluminum films of the same thickness and at the same frequency of electromagnetic radiation, or at least 40 db less than aluminum films of the same thickness and at the same frequency of electromagnetic radiation. In embodiments, NiCr films have an attenuation that is from 15 db to 55 db less than aluminum films of the same thickness and at the same frequency of electromagnetic radiation, such as from 20 db to 55 db less than aluminum films of the same thickness and at the same frequency of electromagnetic radiation, from 25 db to 55 db less than aluminum films of the same thickness and at the same frequency of electromagnetic radiation, from 30 db to 45 db less than aluminum films of the same thickness and at the same frequency of electromagnetic radiation, from 35 db to 45 db less than aluminum films of the same thickness and at the same frequency of electromagnetic radiation, or from 40 db to 45 db less than aluminum films of the same thickness and at the same frequency of electromagnetic radiation.

According to embodiments, metallic components may be made from metallic materials that have the above attributes and can be used in paints, polymers, coatings, or as reflective core layers in multilayer thin films include NiCr alloys, such as, for example, nichrom (80-20), Inconel alloy 600, and nickel-chromium (60-40). Embodiments of metallic components and multilayer thin films comprising these materials as reflective core layers will now be described.

As disclosed previously herein, in some embodiments metallic components described above may be dispersed in various materials, such as, for example, paints, polymers, polymers, and coatings. These metallic components provide reflectance to the material in which they are dispersed, thus providing a shiny or shimmering effect, depending on the application.

Figure 11:
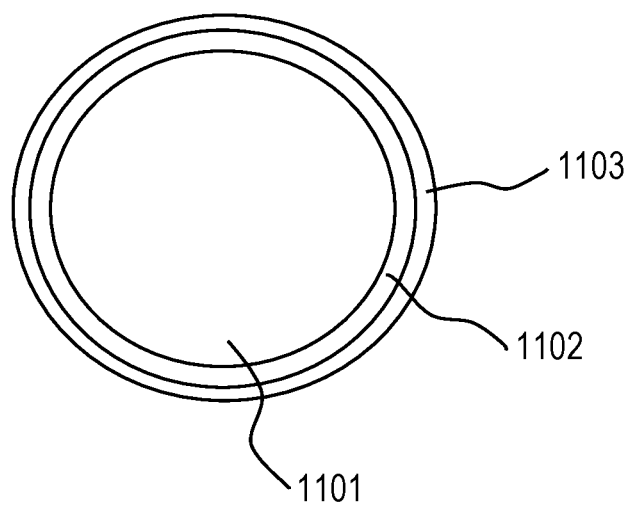
FIG. 11 schematically depicts a discrete metallic particle having a coating and an optional protective layer as disclosed and described herein.

According to embodiments described herein, and with reference to FIG. 11, the metallic components 1101, such as discrete metallic particles, may be at least partially coated with decorative layers 1103. Decorative layers 1103 according to embodiments can comprise coloring components, such as dyes. Dyes that can be used according to embodiments include, azo, indigo, alizarin, anthraquinones, perylenes, phthalocyanines, quinacridones, pyrrole, dioxazine, pyranthrone, perinone, and naphthol. In one or more embodiments, a protective layer 1102 may be applied to the metallic components 1101 before coating the metallic components 1101 with a decorative layer 1103, such that the protective layer 1102 is positioned between the metallic component 1101 and the decorative layer 1103. In embodiments, the protective layer 1102 may be made from $SiO_2$, $Al_2O_3$, $CeO_2$, $ZrO_2$ or combinations thereof. In embodiments, no protective layer is applied to the metallic components 1101 before coating with a decorative layer 1103.

In some embodiments, the metallic components may be anodized to form anodized metallic components before applying a dye to the metal components. Anodizing is a process that electrolytically coats a metallic surface with a protective or decorative oxide layer. In one or more embodiments, the anodizing process may impart color to the metallic components. Anodizing the metallic components may, according to one or more embodiments, comprise pre-treating the metallic components. The pre-treatment may be an etching step which imparts a satin or matte finish to the metallic components according to some embodiments. In other embodiments, the pre-treatment may be a bright dip, which may impart a shiny or reflective finish to the metallic components.

According to embodiments, after the pre-treatment, the metallic components may be submerged in a bath of water and an acid, which serves as an electrolyte. Direct current may be passed through the submerged metallic components so the submerged metallic components act as a positive electrode, thereby breaking down the water and attracting oxygen to its surface of the metallic component. Thus, a transparent and porous oxide coating may be formed on the metallic components. In one or more embodiments, the acid may be sulfuric acid, chromic acid, phosphoric acid, or any other suitable acid conventionally used in anodizing processes. The thickness of this coating may be determined by the level of electrical current and the length of time over which the electrical current is applied to the metallic components.

According to embodiments, after the coating is formed, the metallic components may be colored. In one or more embodiments, the metallic components may be immersed in an inorganic metal salt bath. Current may be applied to deposit metal salts in the pores in the coating of the metallic components. In one or more embodiments, the inorganic metal salt bath may also include organic dyes, such as those disclosed above, to provide color to the metallic components.

According to embodiments, after the metallic components are colored, the metallic components may be sealed. Sealing may be accomplished by any suitable method known in the art, including hot sealing and cold sealing. In one or more embodiments, the anodized metallic components may be dispersed into paints, polymers, or coating materials.

The metallic components described herein may be in the form of discrete particles. It should be appreciated that the discrete particles differ in structure and some properties of a continuous metallic sheet or layer. According to embodiments, the discrete particles of metallic material, which constitute the metallic components, may be formed by first depositing the metallic material onto a carrier substrate using a variety of material deposition and/or materials processing techniques including, for example, physical vapor deposition, chemical vapor deposition, sol gel processes, electron gun evaporation, vacuum evaporation of alternating layers, thermal evaporation, electrochemical deposition and etching processes, high-vacuum vapor deposition and oxidation processes, sputtering of alternating layers, molecular-beam epitaxy processes, thermal mechanical processing, chemical processing, and combinations thereof. Thereafter, the metallic material is broken up into discrete particles. In embodiments, the deposited metallic material may first be separated from the carrier substrate before being broken up into discrete particles. For example, the carrier substrate may be pealed from the metallic material, such as when the carrier substrate is a flexible, polymeric substrate, flexible alloy, or the like. Alternatively, the carrier substrate may be dissolved in a suitable solution thereby leaving behind the metallic material. The metallic material may also be pealed from the substrate. In some embodiments, the metallic material and the carrier substrate are both broken up into discrete particles without separating the metallic material from the substrate.

According to embodiments, the discrete particles may have a thickness from 50 nm to 1000 nm, such as from 100 nm to 1000 nm, from 200 nm to 1000 nm, from 300 nm to 1000 nm, from 400 nm to 1000 nm, from 500 to 1000 nm from 600 to 1000 nm, from 700 to 1000 nm, from 800 to 1000 nm, or from 900 to 1000 nm. In embodiments, the discrete particles may have a thickness from 50 nm to 1000 nm, such as from 50 nm to 900 nm, from 50 nm to 800 nm, from 50 nm to 700 nm, from 50 to 600 nm, from 50 to 500 nm, from 50 to 400 nm, from 50 to 300 nm, from 50 to 200 nm, or from 50 to 100 nm. In some embodiments, the discrete particles can have a thickness from 100 nm to 900 nm, such as from 200 nm to 800 nm, from 300 nm to 700 nm, or from 400 nm to 600 nm. As disclosed above, the discrete particles comprise NiCr metallic materials according to embodiments. In embodiments, the discrete particles may be coating with organic or inorganic coatings. The discrete particles or flakes may, in embodiments, be dispersed into paints, polymers, polymers, or coating materials.

As disclosed above, NiCr material may be used as the reflective core layer of multilayer thin film structures described herein below and may be used to omnidirectionally reflect wavelengths within various spectrum of visible light over a range of angles of incidence or viewing. It will be understood that the terms "electromagnetic wave," "electromagnetic radiation," and "light," as used herein, may interchangeably refer to various wavelengths of light incidence on a multilayer thin film structure and that such light may have wavelengths in the ultraviolet (UV), infrared (IR), and visible portions of the electromagnetic spectrum.

Figure 6A:
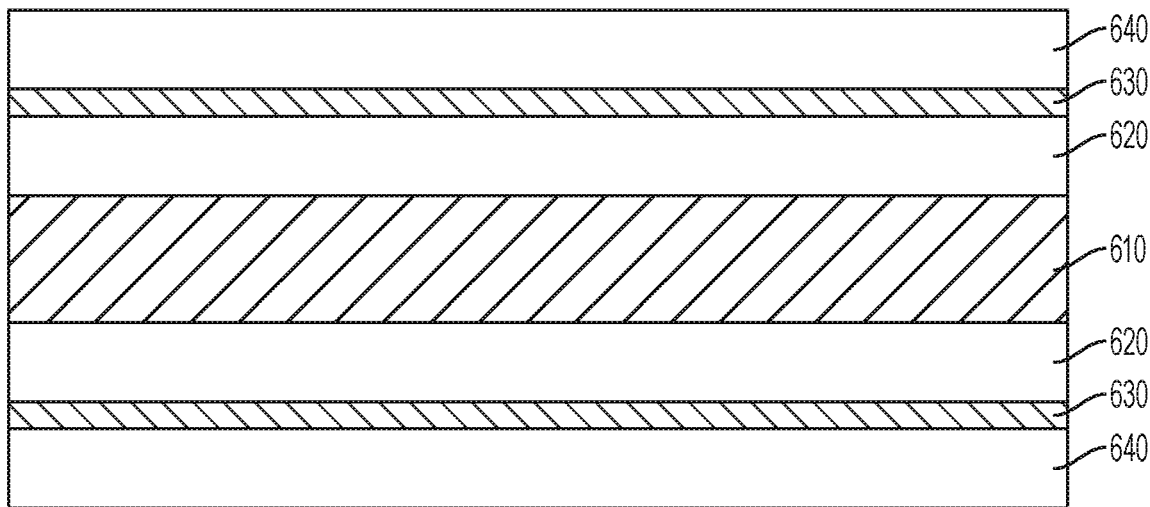
FIGS. 6A and 6B are schematic cross sections of a multilayer thin film structure according to embodiments disclosed and described herein.

Referring now to FIG. 6A, a multilayer thin film 600 according to embodiments disclosed and described herein comprises a reflective core layer 610 comprising NiCr metallic material, a second layer 620 may be a dielectric absorbing layer or a dielectric layer that extends across the reflective core layer 610, a third layer 630 may be a semi-transparent absorbing layer that extends across the second layer 620, and at least one outer layer 640 extends across the third layer 630. In embodiments, the outer layer may be a dielectric layer, and in embodiments, the outer layer may be a dielectric absorbing layer.

Figure 6B:
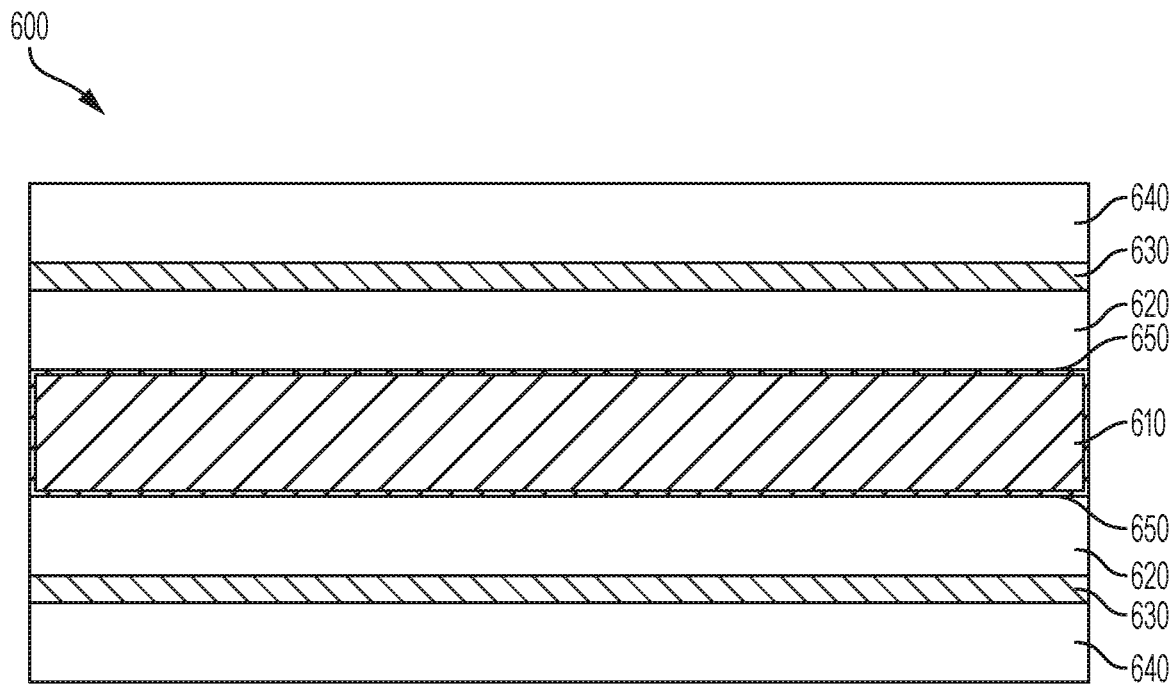

In some embodiments, and with reference to FIG. 6B, the multilayer thin film 600 comprises a reflective core layer 610 comprising a NiCr metallic material, a protective layer 650 that encapsulates the reflective core layer 610, a second layer 620 that extends across at least a portion of the protective layer 650, at least one third layer 630 that extends across the second layer 620, and at least one outer layer 640 that extends across the third layer. In embodiments, the outer layer may be a dielectric layer, and in embodiments, the outer layer may be a dielectric absorbing layer.

In embodiments, the location of absorbing layers may be chosen to increase the absorption of light wavelengths within a certain range, but reflect light in other wavelengths. For example, the location of an absorbing layer may be selected to have increased absorption, of light waves less than or equal to 550 nm, but reflect light waves of approximately 650 nm, such as visible light outside of the hue between 10° and 30°. Accordingly, the absorbing layer is placed at a thickness where the electric field ($|E|^2$) is less at the 550 nm wavelength than at the 650 nm wavelength. Mathematically, this can be expressed as:

$$|E_{550}|^2 << |E_{650}|^2 \qquad (2)$$

and preferably:

$$|E_{650}|^2 \approx 0 \qquad (3)$$

Figure 7:
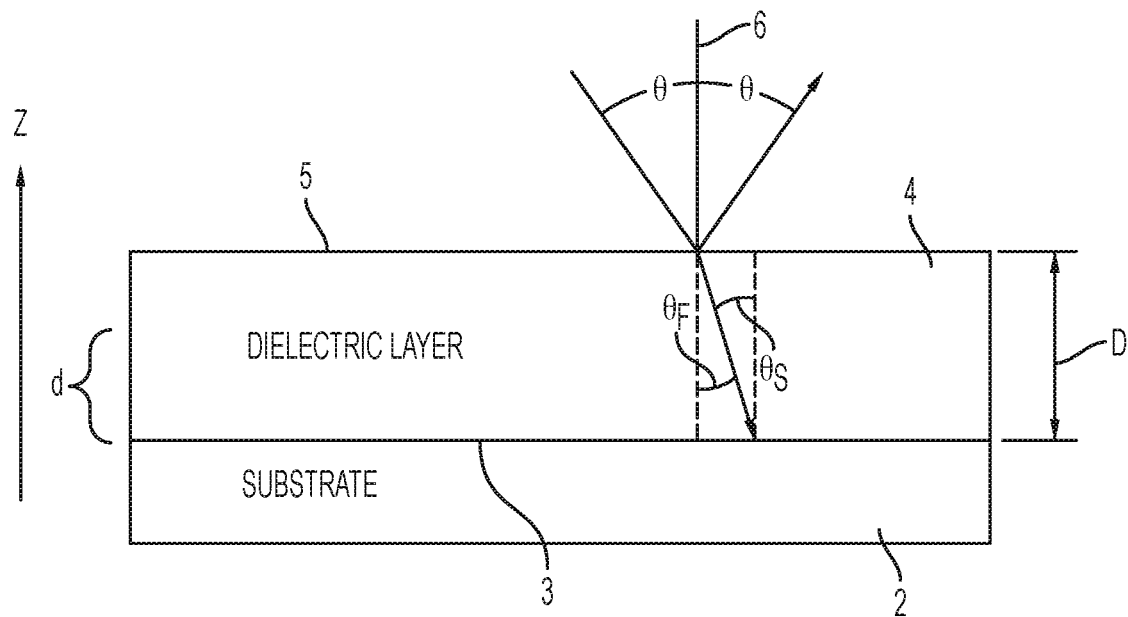
FIG. 7 depicts a multilayer thin film with a dielectric layer extending over a substrate layer and exposed to electromagnetic radiation at an angle θ relative to a normal direction to the outer surface of the dielectric layer.

FIG. 7 and the following discussion provide a method for calculating the thickness of a zero or near-zero electric field point at a given wavelength of light, according to embodiments. For the purposes of the present specification, the term "near-zero" is defined $|E|^2 \leq 10$. FIG. 7 illustrates a multilayer thin film with a dielectric layer 4 having a total thickness "D", an incremental thickness "d" and an index of refraction "n" on a substrate layer 2 having an index of refraction "$n_s$". The substrate layer 2 can be a core layer or a reflective core layer of a multilayer thin film. Incident light strikes the outer surface 5 of the dielectric layer 4 at angle θ relative to line 6, which is perpendicular to the outer surface 5, and reflects from the outer surface 5 at the same angle θ. Incident light is transmitted through the outer surface 5 and into the dielectric layer 4 at an angle $θ_F$ relative to the line 6 and strikes the surface 3 of substrate layer 2 at an angle $θ_s$. For a single dielectric layer, $θ_s = θ_F$ and the energy/electric field (E) can be expressed as E(z) when z=d. From Maxwell's equations, the electric field can be expressed for s polarization as:

$$E^\omega(d) = \{u(z), 0, 0\} \exp(ik\alpha y)|_{z=d} \qquad (4)$$

and for p polarization as:

$$E^\omega(d) = \left\{0, u(z), -\frac{\alpha}{\varepsilon(z)} v(z)\right\} \exp(ik\alpha y)\bigg|_{z=d} \qquad (5)$$

where $$k = \frac{2\pi}{\lambda},$$

is a desired wavelength to be reflected, $\alpha = n_s \sin θ_s$ where "s" corresponds to the substrate in FIG. 7, and $\varepsilon(z)$ is the permittivity of the layer as a function of z. As such:

$$|E(d)|^2 = |u(z)|^2 \exp(2ik\alpha y)|_{z=d} \qquad (6)$$

for s polarization, and $$|E(d)|^2 = \left[|u(z)|^2 + \left|\frac{\alpha}{\sqrt{n}} v(z)\right|^2\right] \exp(2ik\alpha y)\bigg|_{z=d} \qquad (7)$$

for p polarization.

It should be appreciated that variation of the electric field along the Z direction of the dielectric layer 4 can be estimated by calculation of the unknown parameters u(z) and v(z), where it can be shown that:

$$\begin{pmatrix} u \\ v \end{pmatrix}_{z=d} = \begin{pmatrix} \cos\varphi & (i/q)\sin\varphi \\ iq\sin\varphi & \cos\varphi \end{pmatrix} \begin{pmatrix} u \\ v \end{pmatrix}_{z=0, substrate} \quad (8)$$

where 'i' is the square root of −1. Using the boundary conditions $u|_{z=0}=1$, $v|_{z=0}=q_s$, and the following relations:

$$q_s = n_s \cos\theta_s \text{ for } s\text{-polarization} \quad (9)$$

$$q_s = n_s/\cos\theta_s \text{ for } p\text{-polarization} \quad (10)$$

$$q = n \cos\theta_F \text{ for } s\text{-polarization} \quad (11)$$

$$q = n/\cos\theta_F \text{ for } p\text{-polarization} \quad (12)$$

$$\varphi = k \cdot n \cdot d \cos(\theta_F) \quad (13)$$

u(z) and v(z) can be expressed as:

$$u(z)|_{z=d} = u|_{z=0} \cos\varphi + v|_{z=0} \left(\frac{i}{q}\sin\varphi\right) = \cos\varphi + \frac{iq_s}{q}\sin\varphi \quad (14)$$

and $$v(z)|_{z=d} = iqu|_{z=0} \sin\varphi + v|_{z=0} \cos\varphi = iq\sin\varphi + q_s \cos\varphi \quad (15)$$

Therefore:

$$|E(d)|^2 = \left[\cos^2\varphi + \frac{q_s^2}{q^2}\sin^2\varphi\right]e^{2ik\alpha y} = \left[\cos^2\varphi + \frac{n_s^2}{n^2}\sin^2\varphi\right]e^{2ik\alpha y} \quad (16)$$

for s polarization with $\varphi = k \cdot n \cdot d \cos(\theta_F)$ and:

$$|E(d)|^2 = \left[\cos^2\varphi + \frac{n_s^2}{n^2}\sin^2\varphi + \frac{\alpha^2}{n}(q_s^2\cos^2\varphi + q^2\sin^2\varphi)\right] = \quad (17)$$

$$\left[\left(1 + \frac{\alpha^2 q_s^2}{n}\right)\cos^2\varphi + \left(\frac{n_s^2}{n^2} + \frac{\alpha^2 q^2}{n}\right)\sin^2\varphi\right]$$

for p polarization where:

$$\alpha = n_s \sin\theta_s = n \sin\theta_F \quad (18)$$

$$q_s = \frac{n_s}{\cos\theta_s} \quad (19)$$

and $$q_s = \frac{n}{\cos\theta_F} \quad (20)$$

Thus for a simple situation where $\theta_F=0$ or normal incidence, $\varphi = k \cdot n \cdot d$, and $\alpha = 0$:

$$|E(d)|^2 \text{ for s-polarization} = |E(d)|^2 \text{ for p-polarization} =$$

$$\left[\cos^2\varphi + \frac{n_s^2}{n^2}\sin^2\varphi\right] = \quad (21)$$

$$\left[\cos^2(k \cdot n \cdot d) + \frac{n_s^2}{n^2}\sin^2(k \cdot n \cdot d)\right] \quad (22)$$

which allows for the thickness "d" to be solved for (i.e., the position or location within the dielectric layer where the electric field is zero). It should be appreciated that the thickness "d" can also be the thickness of the outer layer 640 extending over the third layer 630 that provides a zero or near zero electric field at the interface between the outer layer and the third layer 630. It should also be appreciated that the above equations can be tailored to absorb and reflect light in other wavelengths.

Referring again to FIG. 6A, a multilayer thin film 600 according to embodiments is shown. The multilayer thin film 600 includes a reflective core layer 610 comprising a NiCr metallic material, a second layer 620 that may be a dielectric absorbing layer or a dielectric layer extending across the reflective core layer 610, a third layer 630 that may be a semi-transparent absorbing layer extending across the second layer 620, and an outer layer 640 extending across the third layer 630. In embodiments, the "outer layer" has an outer free surface (i.e., an outer surface not in contact with an absorbing layer or another dielectric layer that is not part of a protective coating). It should be appreciated that in embodiments two second layers 620, two third layers 630, and two outer layers 640 can be located on opposing sides of the reflective core layer 610 such that the reflective core layer 610 is a core layer sandwiched between a pair of second layers 620, a pair of third layers 630, and a pair of outer layers 640. Such a multilayer thin film with a reflective core layer 610 sandwiched between a pair of second layers 620, a pair of third layers 630, and a pair of outer layers 640 can be referred to as a seven-layer multilayer thin film.

The reflective core layer 610 can, in embodiments, have a thickness from 50 nm to 200 nm, such as from 75 nm to 200 nm, from 100 nm to 200 nm, from 125 nm to 200 nm, from 150 nm to 200 nm, or from 175 to 200 nm. In embodiments, the reflective core layer 610 can have a thickness from 50 nm to 175 nm, such as from 50 nm to 150 nm, from 50 nm to 125 nm, from 50 nm to 100 nm, or from 50 to 75 nm. In some embodiments, the reflective core layer 610 can have a thickness from 75 nm to 175 nm, such as from 100 nm to 150 nm. As disclosed above, the reflective core layer comprises NiCr metallic materials according to embodiments.

The second layer 620 can, according to embodiments, have a thickness from 5 to 500 nm, such as from 50 nm to 500 nm, from 100 nm to 500 nm, from 150 nm to 500 nm, from 200 nm to 500 nm, from 250 nm to 500 nm, from 300 nm to 500 nm, from 350 nm to 500 nm, from 400 nm to 500 nm, or from 450 nm to 500 nm. In some embodiments, the second layer 620 can have a thickness from 5 nm to 450 nm, such as from 5 nm to 400 nm, from 5 nm to 350 nm, from 5 nm to 300 nm, from 5 nm to 250 nm, from 5 nm to 200 nm, from 5 nm to 150 nm, from 5 nm to 100 nm, or from 5 nm to 50 nm. In embodiments, the second layer 620 can have a thickness from 50 nm to 450 nm, such as from 100 nm to 400 nm, from 150 nm to 350 nm, or from 200 nm to 300 nm. In embodiments, the second layer 620 can be made from at least one colorful dielectric material such as $Fe_2O_3$, TiN, or a combination thereof. In embodiments, the second layer 620 may be a dielectric material selected from the group consisting of ZnS, $ZrO_2$, $CeO_2$ $HfO_2$, $TiO_2$, or combinations thereof. In embodiments, the second layer 620 can be deposited across the reflective core layer 610 by chemical vapor deposition (CVD), atomic layer deposition (ALD), plasma enhanced CVD (PECVD), physical vapor deposition (PVD), e-beam deposition, etc.

The third layer 630 can, in embodiments, have a thickness from 5 nm to 20 nm, such as from 10 nm to 20 nm, or from 15 nm to 20 nm. In embodiments, the third layer 630 can have a thickness from 5 nm to 15 nm, such as from 5 nm to 10 nm, or from 10 nm to 15 nm. In embodiments, the third layer 630 can be made from at least one material selected from W, Cr, Ge, Ni, stainless steel, Pd, Ti, Si, V, TiN, Co, Mo, Nb, ferric oxide, amorphous silicon, or combinations thereof. In embodiments, the third layer 630 can be deposited across the second layer 620 by ALD, sputtering, PVD, e-beam deposition, PECVD, etc.

The at least one outer layer 640 can, in embodiments, have a thickness greater than 0.1 quarter wave (QW) to less than or equal to 4.0 QW where the control wavelength is determined by the target wavelength at the peak reflectance in the visible wavelength, such as from 0.5 QW to 4.0 QW, from 1.0 QW to 4.0 QW, from 1.5 QW to 4.0 QW, from 2.0 QW to 4.0 QW, from 2.5 QW to 4.0 QW, from 3.0 QW to 4.0 QW, or from 3.5 QW to 4.0 QW. In embodiments, the at least one outer layer 640 can have a thickness from greater than 0.1 QW to less than 3.5 QW, such as from greater than 0.1 QW to less than 3.0 QW, from greater than 0.1 QW to less than 2.5 QW, from greater than 0.1 QW to less than 2.0 QW, from greater than 0.1 QW to less than 1.5 QW, from greater than 0.1 QW to less than 1.0 QW, or from greater than 0.1 QW to less than 0.5 QW. In some embodiments, the at least one outer layer 640 can have a thickness from 0.5 QW to 3.5 QW, such as from 1.0 QW to 3.0 QW, or from 1.5 QW to 2.5 QW. In embodiments, the target wavelength may be about 1050 nm. The outer layer 640 can be made from a dielectric material with a refractive index greater than 1.6 such as ZnS, $ZrO_2$, $CeO_2$ $HfO_2$, $TiO_2$, or combinations thereof. In embodiments, the outer layer may be deposited by chemical vapor deposition techniques or by atomic layer deposition techniques.

Embodiments of the multilayer thin film 600 described above have a hue shift of less than 30°, such as less than 25°, less than 20°, less than 15°, or less than 10° in the Lab color space when viewed at angles from 0° to 45°.

Referring now to FIG. 6B, a multilayer thin film 600 is shown. The multilayer thin film 600 includes a reflective core layer 610 comprising NiCr metallic material, a protective layer 650 encapsulating the reflective core layer 610, a second layer 620 extending across at least a portion of the protective layer 650, a third layer 630 extending across the second layer 620, and an outer layer 640 extending across the third layer 630. In embodiments, the "outer layer" has an outer free surface (i.e., an outer surface not in contact with an absorbing layer or another dielectric layer that is not part of a protective coating). It should be appreciated that in embodiments two protective layers 650, two second layers 620, two third layers 630, and two outer layers 640 can be positioned on opposing sides of the reflective core layer 610 such that the reflective core layer 610 is a core layer sandwiched between a pair of protective layers 650, a pair of second layers 620, a pair of third layers 630, and a pair of outer layers 640. Such a multilayer thin film with a reflective core layer 610 sandwiched between a pair of protective layers 650, a pair of second layers 620, a pair of third layers 630, and a pair of outer layers 640 can be referred to as a nine-layer multilayer thin film.

The reflective core layer 610 can, in embodiments, have a thickness from 50 nm to 200 nm, such as from 75 nm to 200 nm, from 100 nm to 200 nm, from 125 nm to 200 nm, from 150 nm to 200 nm, or from 175 nm to 200 nm. In embodiments, the reflective core layer 610 can have a thickness from 50 nm to 175 nm, such as from 50 nm to 150 nm, from 50 nm to 125 nm, from 50 nm to 100 nm, or from 50 to 75 nm. In some embodiments, the reflective core layer 610 can have a thickness from 75 nm to 175 nm, such as from 100 nm to 150 nm. As discussed above, in embodiments, the reflective core layer 610 can be made NiCr metallic material.

The at least one protective layer 650 can, in embodiments, have a thickness from 5 nm to 70 nm, such as from 10 nm to 70 nm, from 15 nm to 70 nm, from 20 nm to 70 nm, from 25 nm to 70 nm, from 30 nm to 70 nm, from 35 nm to 70 nm, from 40 nm to 70 nm, from 45 nm to 70 nm, from 50 nm to 70 nm, from 55 nm to 70 nm, from 60 nm to 70 nm, or from 65 nm to 70 nm. In embodiments, the at least one protective layer 650 can have a thickness from 5 nm to 65 nm, such as from 5 nm to 60 nm, from 5 nm to 55 nm, from 5 nm to 50 nm, from 5 nm to 45 nm, from 5 nm to 40 nm, from 5 nm to 35 nm, from 5 nm to 30 nm, from 5 nm to 25 nm, from 5 nm to 20 nm, from 5 nm to 15 nm, or from 5 nm to 10 nm. In embodiments, the at least one protective layer 650 can have a thickness from 10 nm to 65 nm, such as from 15 nm to 60 nm, from 20 nm to 55 nm, from 25 nm to 50 nm, from 30 nm to 45 nm, or from 35 nm to 40 nm. In some embodiments, the protective layer 650 can be made from $SiO_2$, $Al_2O_3$, $CeO_2$, $ZrO_2$ or combinations thereof. In embodiments, the protective layer 650 may be deposited across the reflective core layer 610 by wet chemistry deposition techniques, such as sol gel deposition techniques.

The second layer 620 can, according to embodiments, have a thickness from 5 to 500 nm, such as from 50 nm to 500 nm, from 100 nm to 500 nm, from 150 nm to 500 nm, from 200 nm to 500 nm, from 250 nm to 500 nm, from 300 nm to 500 nm, from 350 nm to 500 nm, from 400 nm to 500 nm, or from 450 nm to 500 nm. In some embodiments, the second layer 620 can have a thickness from 5 nm to 450 nm, such as from 5 nm to 400 nm, from 5 nm to 350 nm, from 5 nm to 300 nm, from 5 nm to 250 nm, from 5 nm to 200 nm, from 5 nm to 150 nm, from 5 nm to 100 nm, or from 5 nm to 50 nm. In embodiments, the second layer 620 can have a thickness from 50 nm to 450 nm, such as from 100 nm to 400 nm, from 150 nm to 350 nm, or from 200 nm to 300 nm. In embodiments, the second layer 620 can be made from at least one colorful dielectric material such as $Fe_2O_3$, TiN, or a combination thereof. In embodiments, the second layer 620 may be a dielectric material selected from the group consisting of ZnS, $ZrO_2$, $CeO_2$ $HfO_2$, $TiO_2$, or combinations thereof. In embodiments, the second layer 620 can be deposited across the reflective core layer 610 by wet chemistry deposition techniques, such as sol gel deposition techniques, or by ALD, sputtering, PVD, e-beam deposition, PECVD, etc.

The third layer 630 can, in embodiments, have a thickness from 5 nm to 20 nm, such as from 10 nm to 20 nm, or from 15 nm to 20 nm. In embodiments, the third layer 630 can have a thickness from 5 nm to 15 nm, such as from 5 nm to 10 nm, or from 10 nm to 15 nm. In embodiments, the third layer 630 can be made from at least one material selected from W, Cr, Ge, Ni, stainless steel, Pd, Ti, Si, V, TiN, Co, Mo, Nb, ferric oxide, amorphous silicon, or combinations thereof. In embodiments, the third layer 630 can be deposited across the second layer 620 by ALD, sputtering, PVD, e-beam deposition, PECVD, etc.

The at least one outer layer 640 can, in embodiments, have a thickness greater than 0.1 quarter wave (QW) to less than or equal to 4.0 QW where the control wavelength is determined by the target wavelength at the peak reflectance in the visible wavelength, such as from 0.5 QW to 4.0 QW, from 1.0 QW to 4.0 QW, from 1.5 QW to 4.0 QW, from 2.0 QW to 4.0 QW, from 2.5 QW to 4.0 QW, from 3.0 QW to 4.0 QW, or from 3.5 QW to 4.0 QW. In embodiments, the at least one outer layer 640 can have a thickness from greater than 0.1 QW to less than 3.5 QW, such as from greater than 0.1 QW to less than 3.0 QW, from greater than 0.1 QW to less than 2.5 QW, from greater than 0.1 QW to less than 2.0 QW, from greater than 0.1 QW to less than 1.5 QW, from greater than 0.1 QW to less than 1.0 QW, or from greater than 0.1 QW to less than 0.5 QW. In some embodiments, the at least one outer layer 640 can have a thickness from 0.5 QW to 3.5 QW, such as from 1.0 QW to 3.0 QW, or from 1.5 QW to 2.5 QW. In embodiments, the target wavelength may be about 1050 nm. The outer dielectric layer can be made from a dielectric material with a refractive index greater than 1.6 such as ZnS, $CeO_2$, $ZrO_2$, $TiO_2$, or combinations thereof. In embodiments, the outer layer may be deposited by wet chemistry deposition techniques, such as sol gel deposition techniques or by ALD, sputtering, PVD, e-beam deposition, PECVD, etc.

Embodiments of the multilayer thin film 600 described above have a hue shift of less than 30°, such as less than 25°, less than 20°, less than 15°, or less than 10° in the Lab color space when viewed at angles from 0° to 45°.

In one or more embodiments, the multilayer thin film 600 comprises a reflective core layer 610 made from NiCr metallic material, a protective layer 650 made from $SiO_2$ encapsulating the reflective core layer 610, a dielectric absorbing layer 620 made from $Fe_2O_3$ extending across at least a portion of the protective layer 650, a semi-transparent absorbing layer 630 made from W extending across the dielectric absorbing layer 620, and an outer layer 640 made from $Fe_2O_3$ extending across the semi-transparent absorbing layer 630.

In one or more embodiments, the multilayer thin film 600 comprises a reflective core layer 610 made from NiCr metallic material, a protective layer 650 made from $SiO_2$ encapsulating the reflective core layer 610, a dielectric layer 620 made from ZnS extending across at least a portion of the protective layer 650, a semi-transparent absorbing layer 630 made from Cr extending across the dielectric layer 620, and an outer layer 640 made from ZnS extending across the semi-transparent absorbing layer 630.

In one or more embodiments, the multilayer thin film 600 comprises a reflective core layer 610 made from NiCr metallic material, a dielectric absorbing layer 620 made from $Fe_2O_3$ extending across at least a portion of the reflective core layer 610, a semi-transparent absorbing layer 630 made from W extending across the dielectric absorbing layer 620, and an optional outer layer 640 made from $Fe_2O_3$ extending across the semi-transparent absorbing layer 630.

In one or more embodiments, the multilayer thin film 600 comprises a reflective core layer 610 made from NiCr metallic material, a dielectric layer 620 made from ZnS extending across at least a portion of the reflective core layer 610, a semi-transparent absorbing layer 630 made from Cr extending across the dielectric layer 620, and an optional outer layer 640 made from ZnS extending across the semi-transparent absorbing layer 630.

Like the discrete particles of NiCr, the multilayer thin films in embodiments disclosed herein can be formed in to flakes. According to embodiments, flakes of the multilayer thin film structure may be formed by first depositing the multilayer thin film structure onto a carrier substrate using a variety of material deposition and/or materials processing techniques including, for example, physical vapor deposition, chemical vapor deposition, sol gel processes, electron gun evaporation, vacuum evaporation of alternating layers, thermal evaporation, electrochemical deposition and etching processes, high-vacuum vapor deposition and oxidation processes, sputtering of alternating layers, molecular-beam epitaxy processes, thermal mechanical processing, chemical processing, and combinations thereof. Thereafter, the multilayer thin film structure is broken up into flakes. In embodiments, the deposited multilayer thin film structure may first be separated from the carrier substrate before being broken up into flakes. For example, the carrier substrate may be pealed from the multilayer thin film structure, such as when the carrier substrate is a flexible, polymeric substrate, flexible alloy, or the like. Alternatively, the carrier substrate may be dissolved in a suitable solution thereby leaving behind the multilayer thin film structure. The multilayer thin film structure may also be pealed from the substrate. In some embodiments, the metallic material and the carrier substrate are both broken up into flakes without separating the multilayer thin film structure from the substrate.

According to embodiments, discrete particles of the metal components and/or the flakes of multilayer thin film structures comprising NiCr may be used in paints, polymers, polymers or coatings. In embodiments, the discrete particles of the metallic components and/or the flakes of multi-layer thin film structures described herein may be incorporated into a liquid carrier, such as an organic or inorganic binder, and utilized in a paint or similar coating system which may be applied to an article of manufacture, thereby imparting the reflectance or shimmer of the metallic component or the omni-directional reflectivity properties of the multi-layer thin film structure to the article. In some embodiments, the discrete particles of the metallic material and/or the multilayer thin film structure (with or without a pigment) may be dispersed in a polymer matrix such that the discrete particles of the metallic component and/or the flakes of the multilayer thin film structure are randomly oriented in the matrix. Thereafter, the paint, coating, or polymer comprising the discrete particles of metallic component and/or the multilayer thin film structure may be deposited on an article of manufacture by spraying, electrostatic charging, powder coating, and the like. The deposited coating thereby imparting the reflectance or shimmer of the metallic component or the omni-directional reflectivity properties of the multi-layer thin film structure to the article to which it is applied.

According to embodiments, at least one of paint binders and fillers can be used and mixed with the pigments to provide a paint that displays an omnidirectional structural color. In addition, other additives may be added to the multilayer thin film to aid the compatibility of multilayer thin film in the paint system. Exemplary compatibility-enhancing additives include silane surface treatments that coat the exterior of the multilayer thin film and improve the compatibility of multilayer thin film in the paint system.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

EXAMPLES

Figure 8:
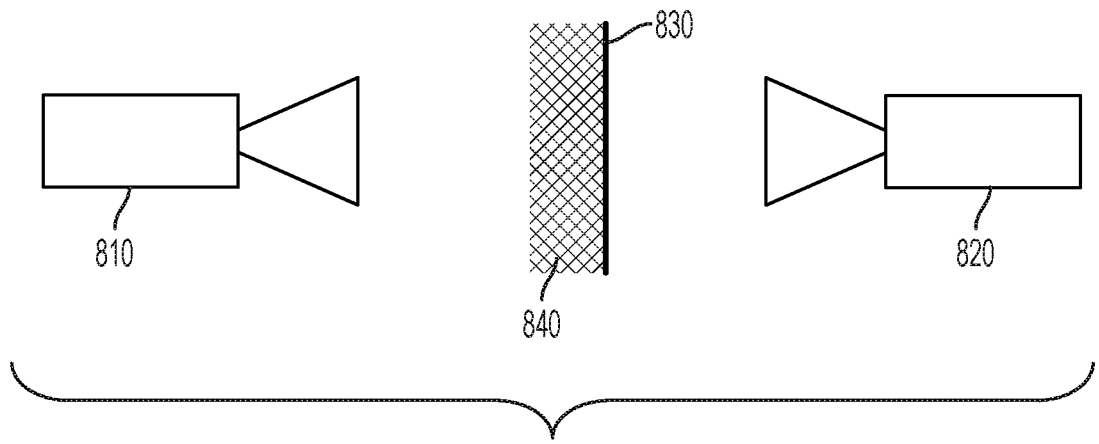
FIG. 8 is a schematic of the testing mechanism for determining the transmission attenuation of a metallic material.

The transmission attenuation for various metallic thin films were measured. Thin films of Aluminum and NiCr metallic material were deposited on nonconducting glass substrates. The thickness of the metallic material varied from 50 nm to 500 nm as shown in Table 1, while thickness of glass substrate was kept around 2 mm. The frequencies covered were between 76-81 GHz and 22-26 GHz. The measurement method and data analysis method were carried out according to the standard automotive radar measurement procedure, as shown in FIG. 8. Namely, the metallic material 640 was deposited on a glass substrate 830 and the combination was placed between a mm-wave transmitting device 810 and a mm-wave sensing device 820. It should be understood that it does not matter whether the mm-wave transmitting device 810 is facing the metallic material 840 or the glass substrate 830. A mm-wave having the frequency reported in Table 1 is formed and transmitted from the mm-wave transmitting device 810 through the metallic material 840 and the glass substrate 830 and received by the mm-wave sensing device 820.

TABLE 1

| No. | Material | Metallic Material Thickness (nm) | Substrate Thickness (mm) |
|---|---|---|---|
| 1 | NiCr | 50 | 1.988 |
| 2 | NiCr | 50 | 1.987 |
| 3 | NiCr | 100 | 1.988 |
| 4 | NiCr | 100 | 1.989 |
| 5 | NiCr | 250 | 1.988 |
| 6 | NiCr | 250 | 1.983 |
| 7 | NiCr | 500 | 1.998 |
| 8 | NiCr | 500 | 1.990 |
| 9 | Al | 50 | 1.995 |
| 10 | Al | 50 | 2.000 |
| 11 | Al | 100 | 1.987 |
| 12 | Al | 100 | 2.007 |
| 13 | Al | 250 | 2.016 |
| 14 | Al | 500 | 1.980 |
| 15 | Al | 500 | 2.001 |
| 16 | Glass Base Material | | 1.989 |

Figure 9A:
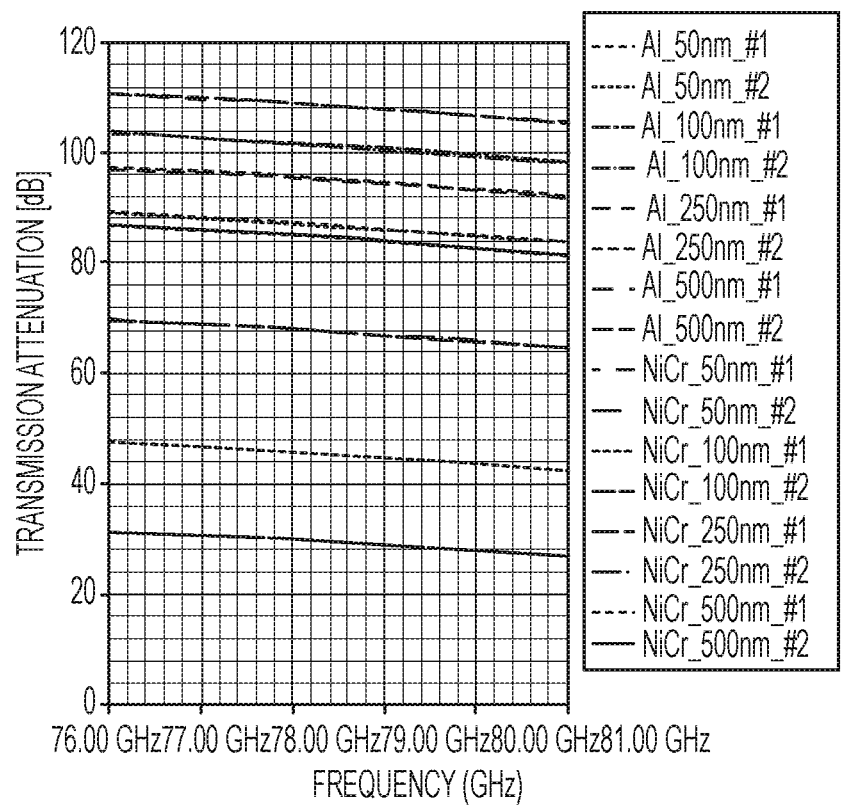
FIG. 9A graphically depicts the transmission attenuation in decibels versus frequency in frequency ranges from 76 to 81 gigahertz for aluminum and NiCr metallic materials having thicknesses of 50 nm, 100 nm, 250 nm, and 500 nm.
Figure 9B:
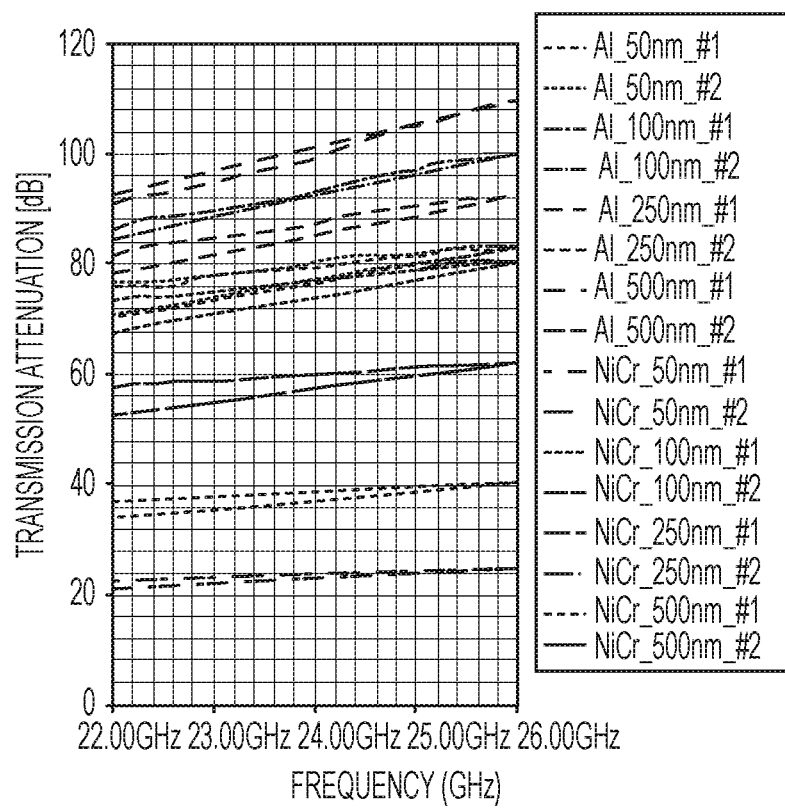
FIG. 9B graphically depicts the transmission attenuation in decibels versus frequency in frequency ranges from 22 to 26 gigahertz for aluminum and NiCr metallic materials having thicknesses of 50 nm, 100 nm, 250 nm, and 500 nm.
Figure 10:
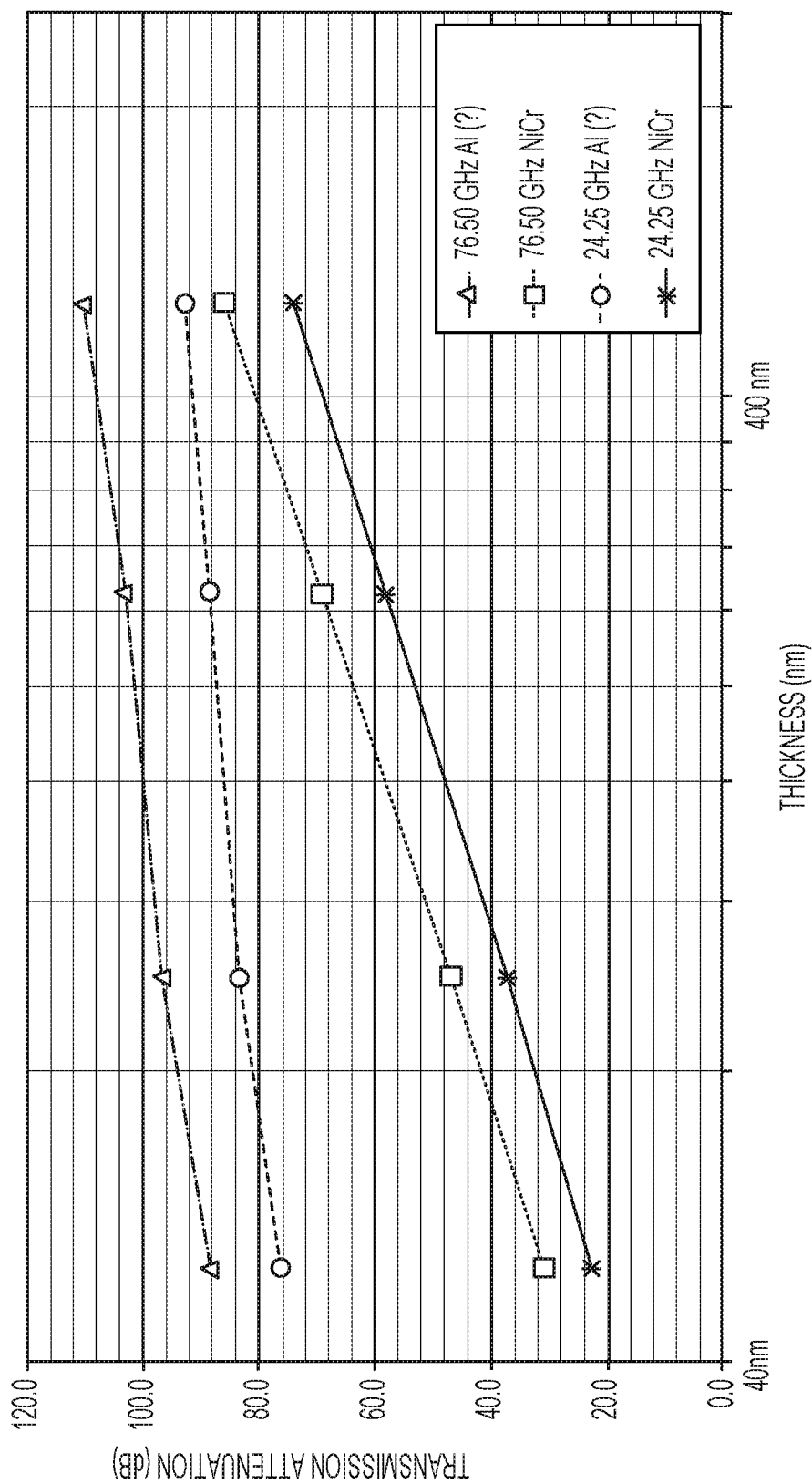
FIG. 10 graphically depicts the transmission attenuation in decibels versus the thickness in nanometers of aluminum and NiCr metallic materials measured at frequencies of 24.25 gigahertz and 76.50 gigahertz.

The results of the above tests are shown in FIGS. 9A, 9B, and 10, where it is seen that NiCr films show about 50 dB better transmission than Al film of same thickness. These results were consistent throughout the entire frequency range.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A discrete metallic particle comprising:
a metallic material;
a coating covering at least a portion of the metallic material, wherein
the discrete metallic particle has a thickness from 50 nm to 1000 nm, and
the discrete metallic particle has a skin depth δ of greater than or equal to 1.0 μm in a frequency range from 20-40 GHz, wherein
skin depth δ is calculated by:

$$\delta = \sqrt{\frac{2\rho}{(2\pi f)(\mu_0 \mu_r)}} \approx 503\sqrt{\frac{\rho}{\mu_r f}},$$

δ is skin depth in meters (m); ρ is resistivity in ohm meter (Ω·m); f is frequency of an electromagnetic radiation in hertz (Hz); $\mu_0$ is permeability; and $\mu_r$ is relative permeability of the metallic material.

2. The discrete metallic particle of claim 1, wherein the discrete metallic particle has a skin depth δ of greater than or equal to 0.5 μm in a frequency range from 40-100 GHz, and
skin depth δ is calculated by:

$$\delta = \sqrt{\frac{2\rho}{(2\pi f)(\mu_0 \mu_r)}} \approx 503\sqrt{\frac{\rho}{\mu_r f}},$$

δ is skin depth in meters (m); ρ is resistivity in ohm meter (Ω·m); f is frequency of an electromagnetic radiation in hertz (Hz); $\mu_0$ is permeability; and $\mu_r$ is relative permeability of the metallic material.

3. The discrete metallic particle of claim 1, wherein the coating is an anodized coating.

4. The discrete metallic particle of claim 3, wherein the anodized coating is colored by a dye.

5. The discrete metallic particle of claim 4, wherein the anodized coating is colored by an organic dye.

6. The discrete metallic particle of claim 5, wherein the organic dye is selected from the group consisting of azo, indigo, alizarin, anthraquinones, perylenes, phthalocyanines, quinacridones, pyrrole, dioxazine, pyranthrone, perinone, naphthol, and combinations thereof.

7. The discrete metallic particle of claim 1, wherein the metallic material comprises NiCr.

8. The discrete metallic particle of claim 1, further comprising a protective layer applied to the metallic material and positioned between the metallic material and the coating covering at least a portion of the metallic material.

9. A paint, polymer, or coating system comprising the discrete metallic particle of claim 1.

10. A multilayer thin film that reflects an omnidirectional structural color comprising:
a reflective core layer comprising a metallic material and a coating;
a second layer extending across the reflective core layer, wherein the second layer is a dielectric absorber or dielectric material;
a third layer extending across the second layer, wherein the third layer comprises a semi-transparent absorbing layer; and
an outer layer extending across the third layer, wherein the outer layer is formed from a dielectric material or a colorful dielectric material, wherein
the multilayer thin film reflects a single narrow band of visible light that is less than 30° measured in Lab color space when the multilayer thin film is exposed to broadband electromagnetic radiation and viewed from angles between 0° and 45° relative to a direction normal to an outer surface of the multilayer thin film, and
the reflective core layer has a skin depth δ of greater than or equal to 1.0 μm in a frequency range from 20-40 GHz, wherein the skin depth δ is calculated by:

$$\delta = \sqrt{\frac{2\rho}{(2\pi f)(\mu_0 \mu_r)}} \approx 503\sqrt{\frac{\rho}{\mu_r f}},$$

wherein
δ is skin depth in meters (m); ρ is resistivity in ohm meter (Ω·m); f is frequency of an electromagnetic radiation in hertz (Hz); $\mu_0$ is permeability; and $\mu_r$ is relative permeability of the metallic material.

11. The multilayer thin film of claim 10, wherein the reflective core layer has a skin depth δ of greater than or equal to 0.5 μm in a frequency range from 40-100 GHz, wherein skin depth δ is calculated by:

$$\delta = \sqrt{\frac{2\rho}{(2\pi f)(\mu_0 \mu_r)}} \approx 503 \sqrt{\frac{\rho}{\mu_r f}},$$

wherein
δ is skin depth in meters (m); ρ is resistivity in ohm meter (Ω·m); f is frequency of an electromagnetic radiation in hertz (Hz); $\mu_0$ is permeability; and $\mu_r$ is relative permeability of the metallic material.

12. The multilayer thin film of claim 10, wherein the second layer is formed from $Fe_2O_3$, TiN, ZnS, or combinations thereof.

13. The multilayer thin film of claim 10, wherein the third layer is formed from W, Cr, Ge, Ni, stainless steel, Pd, Ti, Si, V, TiN, Co, Mo, Nb, ferric oxide, amorphous silicon, or combinations thereof.

14. The multilayer thin film of claim 10, wherein the outer layer is formed from a dielectric material selected from the group consisting of ZnS, $ZrO_2$, $CeO_2$, $TiO_2$, or combinations thereof.

15. The multilayer thin film of claim 10, wherein the coating is an anodized coating.

16. The multilayer thin film of claim 15, wherein the anodized coating is colored by a dye.

17. The multilayer thin film of claim 16, wherein the metallic material is colored by an organic dye.

18. The multilayer thin film of claim 17, wherein the organic dye is selected from the group consisting of azo, indigo, alizarin, anthraquinones, perylenes, phthalocyanines, quinacridones, pyrrole, dioxazine, pyranthrone, perinone, naphthol, and combinations thereof.

19. The multilayer thin film of claim 10, wherein the metallic material comprises NiCr.

20. A paint, polymer, or coating comprising the multilayer thin film of claim 10.

* * * * *

UNITED STATES PATENT AND TRADEMARK OFFICE
CERTIFICATE OF CORRECTION

| | | |
|---|---|---|
| PATENT NO. | : 11,339,495 B2 | Page 1 of 1 |
| APPLICATION NO. | : 16/878724 | |
| DATED | : May 24, 2022 | |
| INVENTOR(S) | : Debasish Banerjee et al. | |

It is certified that error appears in the above-identified patent and that said Letters Patent is hereby corrected as shown below:

In the Specification

In Column 7, Line 47, after "depth" insert --$\delta$--.

In Column 14, Line 51, before "is" insert --$\lambda$--.

In Column 15, Line 35, before "and" insert --,--.

In the Claims

In Column 21, Line 61, delete " $\delta = \sqrt{\frac{2\rho}{(2\pi f)(\mu_0 \mu_r)}} \approx 503 \sqrt{\frac{\rho}{\mu_r f}}$, " insert -- $\delta = \sqrt{\frac{2\rho}{(2\pi f)(\mu_0 \mu_r)}} \approx 503 \sqrt{\frac{\rho}{\mu_r f}}$, wherein--, therefor.

Signed and Sealed this
Fifteenth Day of November, 2022

*Katherine Kelly Vidal*
Katherine Kelly Vidal
*Director of the United States Patent and Trademark Office*